Figure 1:
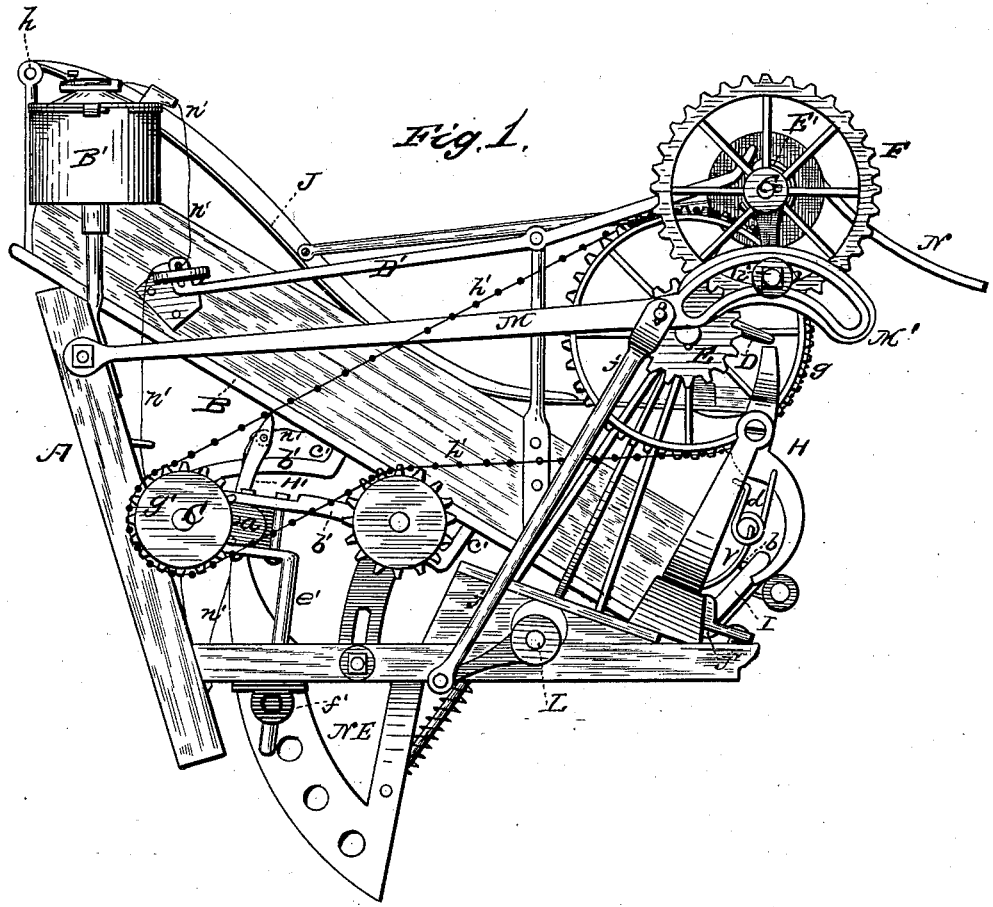

(No Model.) 7 Sheets—Sheet 1.

H. AMUNDSON & A. OLSON.
GRAIN BINDER.

No. 279,309. Patented June 12, 1883.

WITNESSES
E. H. Bates
Philip C. Masi

INVENTORS
Hans Amundson
Amond Olson
by Anderson Smith
their ATTORNEYS (No Model.) 7 Sheets—Sheet 2.
H. AMUNDSON & A. OLSON.
GRAIN BINDER.
No. 279,309. Patented June 12, 1883.
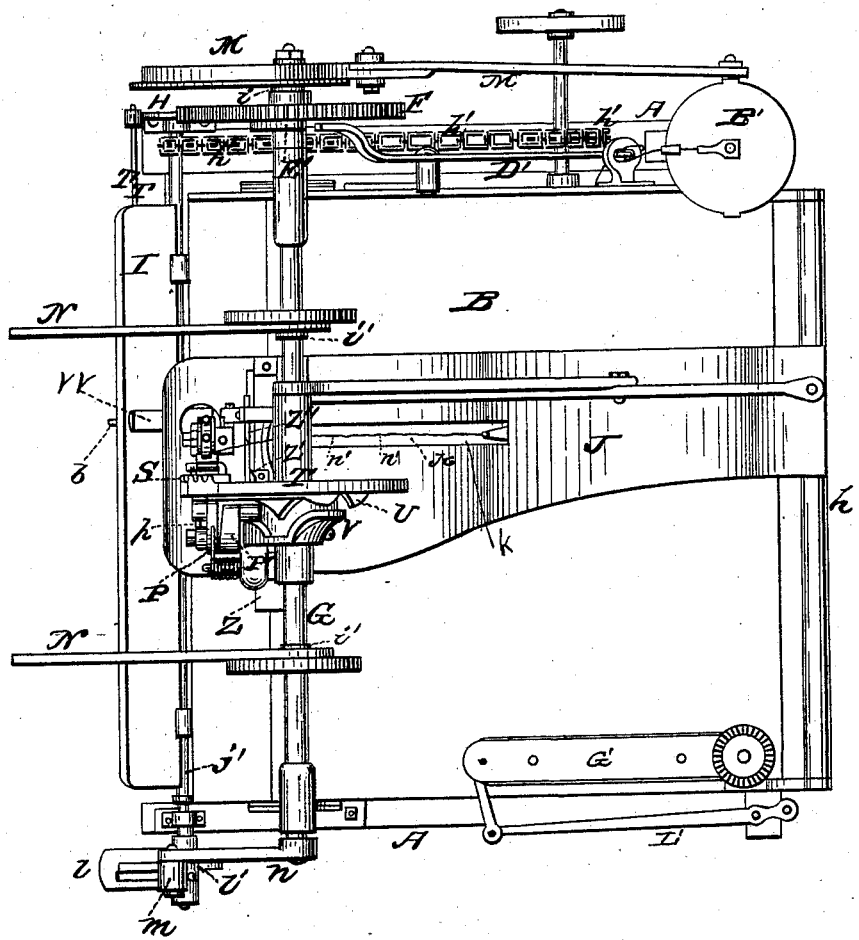
WITNESSES
E. H. Bates
Philip C. Masi.
INVENTORS
Hans Amundson
Amond Olson.
by Anderson & Smith
their ATTORNEYS (No Model.)
H. AMUNDSON & A. OLSON.
GRAIN BINDER.
No. 279,309. Patented June 12, 1883.
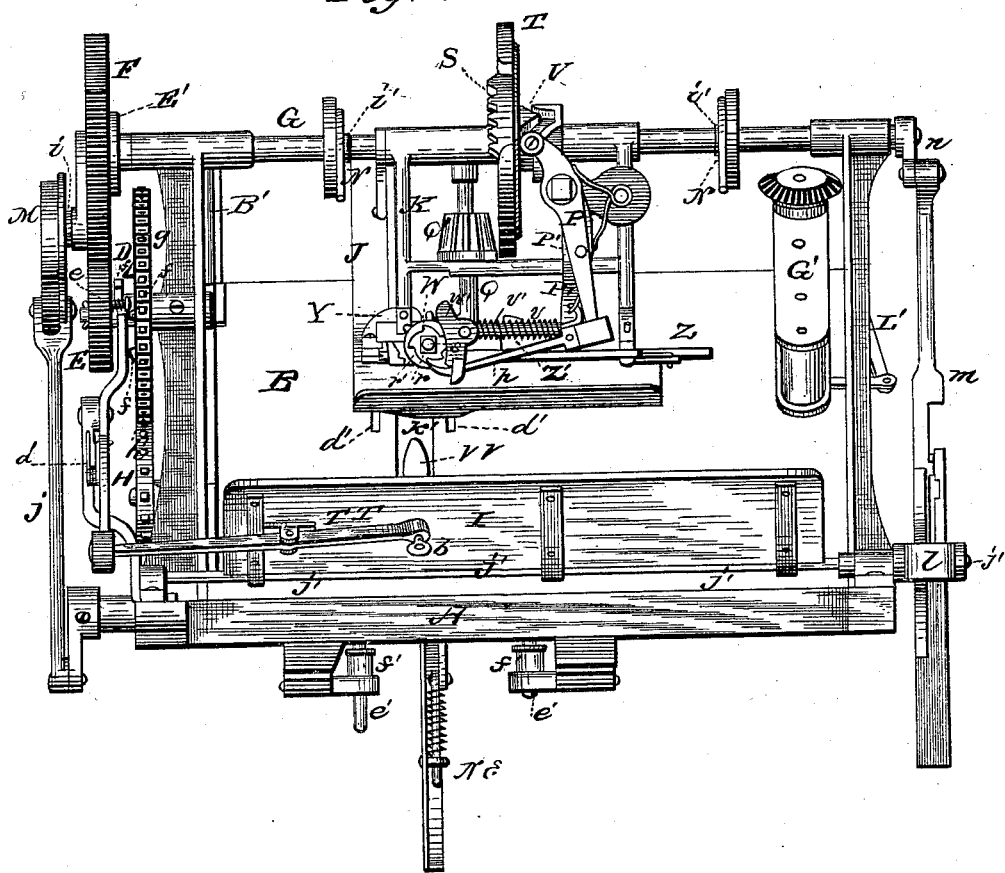
WITNESSES
E. H. Bates
Philip C. Masi.
INVENTORS
Hans Amundson.
Amond Olson.
by Anderson & Smith
their ATTORNEYS (No Model.) 7 Sheets—Sheet 4.
H. AMUNDSON & A. OLSON.
GRAIN BINDER.
No. 279,309. Patented June 12, 1883.
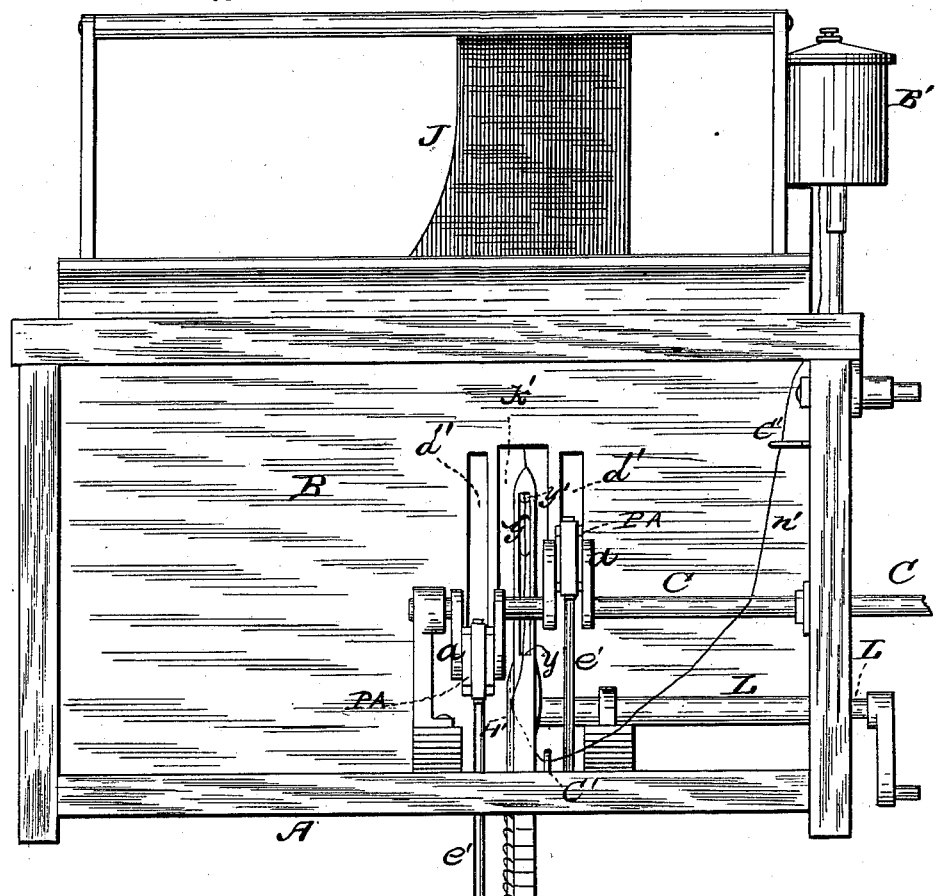
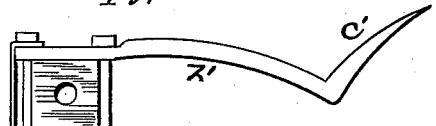
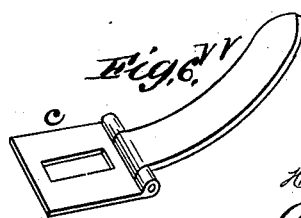
WITNESSES
E. H. Bates
Philip Lemas
INVENTORS
Hans Amundson
Amond Olson
by Anderson & Smith
their ATTORNEYS
N. PETERS, Photo-Lithographer, Washington, D. C.

(No Model.) 7 Sheets—Sheet 5.
H. AMUNDSON & A. OLSON.
GRAIN BINDER.
No. 279,309. Patented June 12, 1883.
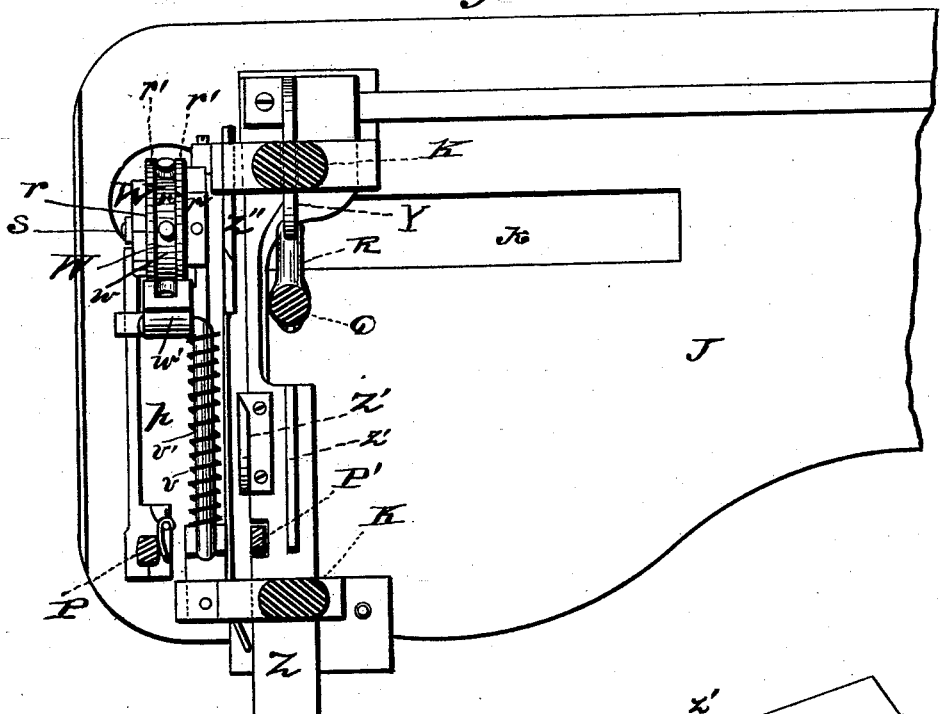
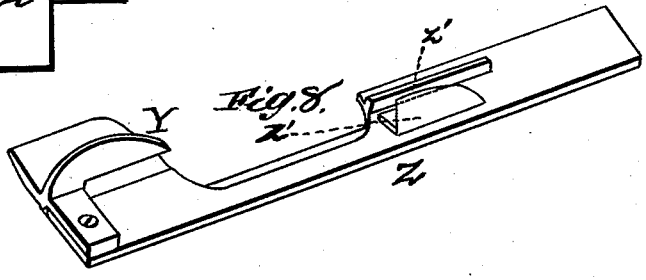
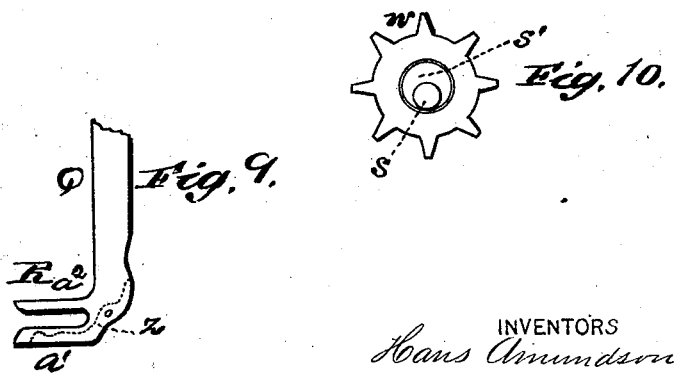
WITNESSES
E. H. Bates
Philip Le Masi
INVENTORS
Hans Amundson
Amond Olson
by Anderson & Smith
their ATTORNEYS
N. PETERS. Photo-Lithographer. Washington. D. C.

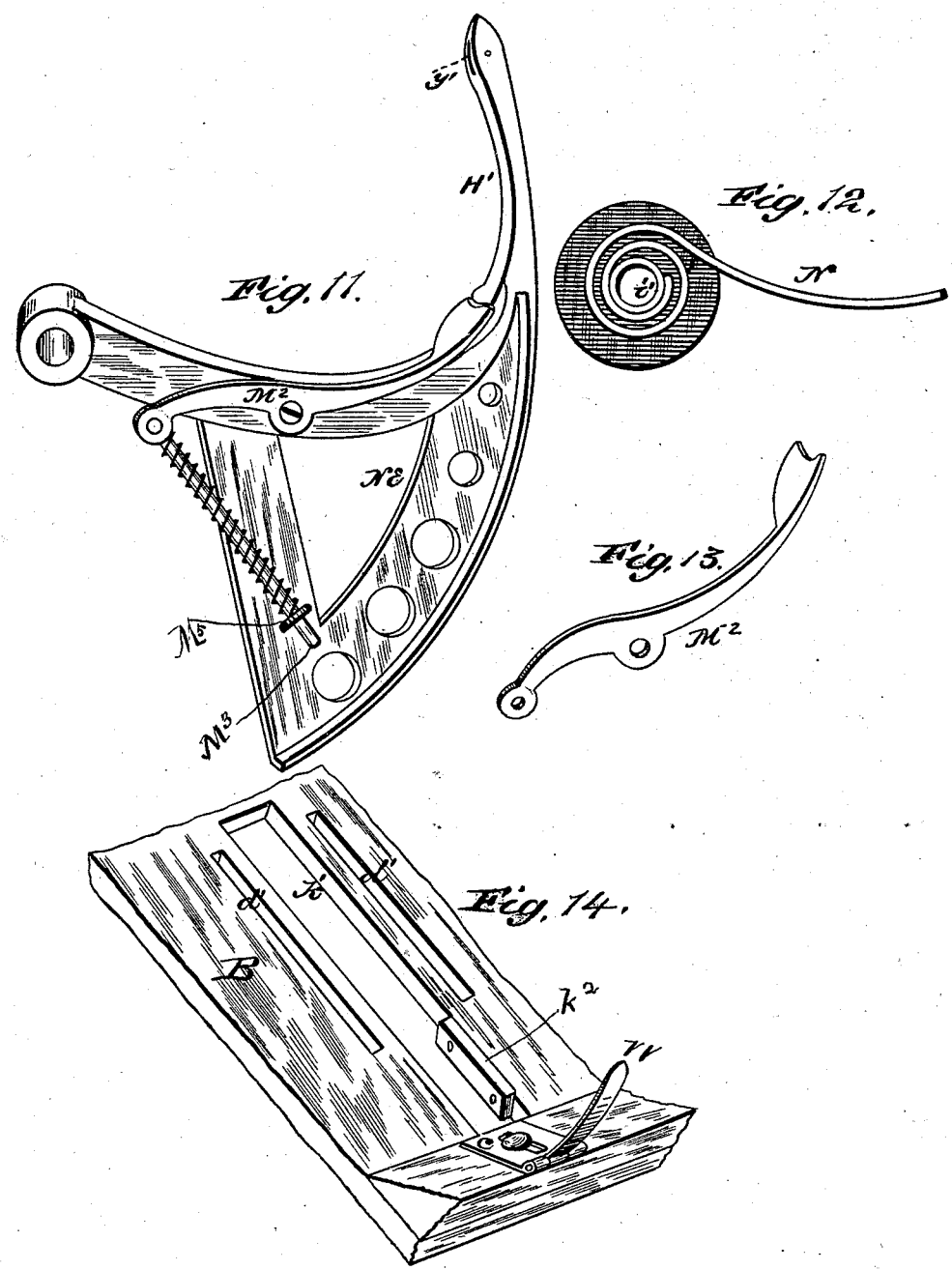

(No Model.) 7 Sheets—Sheet 7.
H. AMUNDSON & A. OLSON.
GRAIN BINDER.
No. 279,309. Patented June 12, 1883.
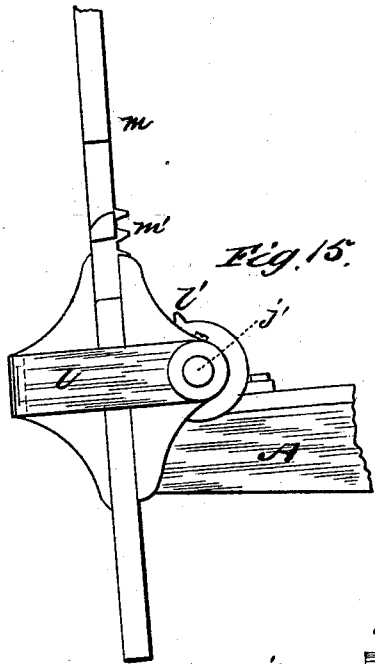
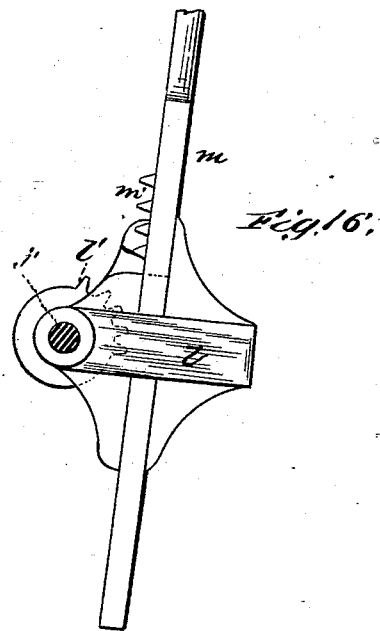
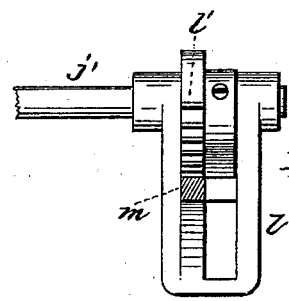
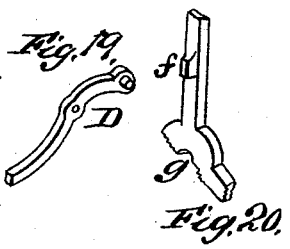
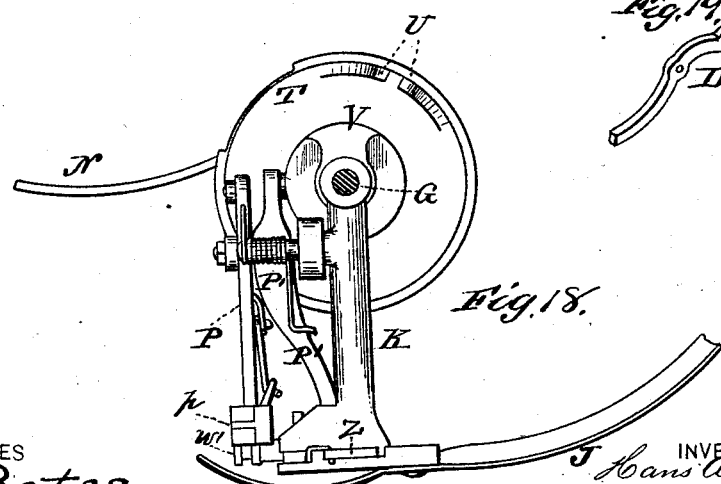
WITNESSES
E. H. Bates
Philip C. Masi
INVENTORS
Hans Amundson
Amond Olson
by Anderson & Smith
their ATTORNEYS

United States Patent Office.

HANS AMUNDSON AND AMOND OLSON, OF ST. CHARLES, MINNESOTA.

GRAIN-BINDER.

SPECIFICATION forming part of Letters Patent No. 279,309, dated June 12, 1883.

Application filed March 25, 1882. (No model.)

*To all whom it may concern:*

Be it known that we, HANS AMUNDSON and AMOND OLSON, citizens of the United States, and residents of St. Charles, in the county of Winona and State of Minnesota, have invented a new and valuable Improvement in Grain-Binders; and we do hereby declare that the following is a full, clear, and exact description of the construction and operation of the same, reference being had to the annexed drawings, making a part of this specification, and to the letters and figures of reference marked thereon.

Figure 1 is a side view of our improved grain-binder. Fig. 2 is a top or plan view of the same. Fig. 3 is a view from the stubble side of the machine. Fig. 4 is a view of the same, seen from the grain side of the machine. Fig. 5 is a side view of one of the packers removed from the binder. Fig. 6 is a detail view of the compressor. Fig. 7 is a horizontal sectional view, looking down upon the twine-holder. Fig. 8 is a perspective view of the slide removed from the binder. Fig. 9 is a detail view of the knotter detached from the binder. Fig. 10 is a side view, in detail, of the tooth-plate. Fig. 11 is a perspective view of the needle-arm and pivoted compressor. Fig. 12 is a detail view of one of the discharging-arms. Fig. 13 is a detail view of the pivoted compressor removed from the needle-arm. Fig. 14 is a view of a portion of the floor of the binder. Figs. 15, 16, 17, 19, and 20 are detail views of parts of the binder; and Fig. 18 is a detail vertical sectional view, showing part of the mechanism for operating the knotter.

This invention has relation to grain-binders; and it consists in the novel construction and arrangement of parts, as will be hereinafter fully described, and particularly pointed out in the claims appended.

In the accompanying drawings, A designates the frame-work of the binder attachment, supporting the inclined plane or slide-floor B and the operating mechanism.

C represents the power-shaft under the rear portion of the inclined plane, said shaft being designed to carry a sprocket-wheel to engage a chain from the harvester. The shaft C is provided with cranks $a$, on which are pivoted the tailed packers P A, having forwardly-extending arms $b'$, terminated by upwardly-extending fingers $c'$, which work through slots $d'$ in the inclined plane, acting alternately to push the grain forward and downward toward the foot-board and compressor at the foot of the inclined plane. The tails $e'$ of the packers reciprocate in bearings in a rock-shaft, $f''$, journaled in the frame-work, this shaft serving to govern the vibratory movements of the packers. The shaft C is provided with a sprocket-wheel, $g'$, which is connected by means of a chain, $h'$, with a sprocket-wheel, $g$, which is provided with projections $f$, to engage the head of a dog, D, when said head is raised by a spring, $e$. The dog D is pivoted to a gear-wheel, E, which engages the gear-wheel F on the end of the binder-shaft G. The binder-shaft is therefore put in operation when the head of the dog D is raised, and this is designed to be accomplished automatically by the accumulation of sufficient grain on the lower part of the inclined plane against the compressor-fingers V V in the following manner: A stop-lever, H, is pivoted to an arm of the frame, and is held by a spring, $d$, in engagement with the tail of the dog D. The compressor V V is pivoted to a plate, $c$, which is usually slotted for adjustment at the lower edge of the inclined plane, and through the foot-board I extends an adjustable pin, $b$, which is connected to a lever, T T, pivoted to the foot-board, said pin $b$ serving as a stop for the compressor, so that when sufficient grain to form a bundle has been accumulated against the compressor the lever T T will be put in operation. This lever engages the end of the stop-lever H, and when put in action by the compressor moves said stop-lever out of engagement with the dog D, allowing its head to rise, and effect an engagement between the sprocket-wheel $g$ and the gear E, so that the binder-shaft G is set in motion by the intervention of the coupling-dog.

J represents a broad guard-plate, the upper and rear end of which is supported by a transverse bar, $h$, which is elevated above the upper end of the inclined plane by suitable arms of the frame, and the lower and front end of which is suspended from the binder-shaft G by means of a hanger, K. The guard-plate is slotted at $k$ longitudinally, and in the inclined plane B a slot, $k'$, is provided, under the slot $k$ and between the slots $d'$, through which the packers play. The slots $k$ and $k'$ are designed for the passage of the needle-arm N E, which is attached to a rock-shaft, L, under the front portion of the inclined plane, said shaft being operated from the gear F by means of a cam-lever, M, engaging a wrist-pin, $i$, on said gear, and a rod, $j$, connecting the cam-lever to an arm at the end of the rock-shaft.

On the binder-shaft G, at each side of the hanger K, is secured a discharging-arm, N, its coiled or spring end being attached to a hub, $i'$, on the shaft. These elastic or spring dischargers N are designed to operate in connection with the foot-board I, which is attached to a rock-shaft, $j'$, having a loop-arm, $l$, and segment-gear $l'$ to engage a depending slide-arm $m$, having a rack, $m'$, said slide-arm being pivoted to a crank-arm, $n$, at the end of the binder-shaft G, as shown in the drawings. The normal position of the foot-board is up, as shown in Figs. 1 and 3; but when the shaft G revolves, the foot-board is, by means of the slide-arm $m$, brought up squarely against the bundle at the foot of the inclined plane, and as the discharging-arms engage the bundle the foot-board is suddenly thrown open by the rack and segment, so that the bundle is expelled with some force. After the grain is packed against the compressor V V and trips the dog D, the needle-arm carrying the twine $n'$ moves forward through the slots of the inclined plane and guard-plate over the knot-tying devices, which latter are put in operation, as follows:

Bearings are provided on the hanger or framing which supports the guard-plate J for a pawl-operating lever, P, a slide-operating lever, P', and the rotating stem Q of the tying-bill R, said stem being provided with a pinion, Q'. These parts are operated from the shaft G, which carries a wheel, T, having the segment-gear S, for engagement with the pinion Q', the cam U on the side of wheel T for the pawl-lever P, and the cam V for the slide-lever P'. The pawl-lever P carries at its lower end a spring-pawl, $p$, which engages the ratchet $r$ of the twine-holder W. This consists of two circular plates, $r'$, mounted on a stud, $s$, and holding between them a marginally-toothed disk or plate, $w$, which is mounted on an eccentric bearing, $s'$, of the stud $s$, and is made to move with the plates $r'$ by means of engaging teeth, the eccentric causing the teeth of the disk $w$ to project beyond the margins of the side plates, $r'$, above, and to be retracted between them below. It will be seen that this operation will cause the teeth to engage the cord and press it against the cap-piece $w'$ (below mentioned) when the cord is to be held; but after it is cut there will be a short piece still held which it is desirable to get rid of. This is done when the eccentric causes the teeth of the disks to be drawn in between the plates $v'$ $v'$, which in this movement act to push off the cord end, which is held by any one of the teeth. Engaging the side of the rotating twine-holder W is the pivoted cap-piece, $w'$, arranged at the end of an arm, $v'$, which carries a spring, $v$, which tends to keep the cap-piece pressed up against the rotary holder W. The cap-piece is grooved in front to receive the teeth of the middle plate, $w$, and by its engagement with these teeth and the rotary plates serves to hold the twine firmly.

R represents the tying-bill, extending horizontally from the lower end of its stem Q. The tying-bill is formed with an upper branch, $a^2$, and two lower branches, $a'$, between which is pivoted a tongue-catch, $z$, which lies between said lower branches in a depressed position, disengaged, until raised by the rib $z'$ on the slide Z, which also acts as a loop-stripper, and is operated by the cam V and the lever P'. The slide Z also carries the cutter Z', which, acting in conjunction with the stationary cutter Z'', severs the twine when the knot is tied. A guard-finger, Y, extends over the toe of the tying-bill, and serves to keep the twine which is brought up by the needle in proper position until the twine has been grasped by the twine-holder. The twine $n'$ is fed from a receptacle, B', through guide-eyes C' into and through a passage, $y$, in the needle to its point end, in which is the eye $y'$, through which the twine passes downward to be connected by its end to the twine-holder. On its passage from the receptacle B' to the needle the twine passes through an eye in the end of the take-up lever D', which is pivoted to an arm of the frame, and is operated to take up the slack while the bundle is being tied by means of the cam E' on the cog-wheel F.

In order that the grain may be fed truly down the inclined plane and the butts of the bundles squarely formed, a butt-apron, G', is pivoted by its upper end to the butt side of the inclined plane, and is provided with a lever, L', connected to its lower end, whereby it can be easily regulated for longer or shorter grain. As soon as the weight of the accumulated grain is sufficient to force the lower compressor, V V, against and depress the adjustable pin $b$, which projects through the foot-board, and is connected to the inner end of the lever T T, the outer end of the said lever T T will bear against the stop-lever H, causing the upper end of said stop-lever to become disengaged from the tail of the dog D, thereby throwing the binding and tying mechanism into operation, and this mechanism will continue to operate until the gavel has been bound and discharged from the machine, and the tying and binding mechanism have assumed their normal positions, when the mechanism will stop until again set in operation by the weight of the accumulated grain, as before described. The needle-arm is recessed to receive the upper end of a compressor, M², which also serves as a cord-placer, pivoted to one side of the needle-arm N E, and having a hinged guide-rod, M⁴, encircled by a replacing-spring, and working in a guide-bearing, M⁵, projecting from the same side of the needle-arm, as shown in Fig. 11. The slot $k'$ in the inclined platform B is provided near its lower end with a stop, $k^2$, against which the lower end of the compressor $M^2$ strikes when the needle-arm has carried it up that far, and projects compressor $M^2$ from its seat toward the compressor V V, thereby assisting in the formation of the bundle, one end of which is attached to the twine-holder. The needle brings up the other end over the tying-bill, cutters, and twine-holder, and the twine thus brought up is caught by the teeth of the holder and carried downward between the same and its cap-piece. Meanwhile the tying-bill is rotated, forming a loop around its body and between the holder and the bundle. As the knotter continues to turn it receives the two ends of the twine between its upper and lower jaws, and the slide being now pushed under the lower jaw its ridge closes the catch-tongue over the cord, holding the end until the loop around the tying-bill is pushed over its toe, said loop then closing on the cord ends, which are held by the catch-tongue, forming a secure knot. The ends are cut by the engagement of the cutter on the slide with the stationary knife just before the loop is pushed off the knotter. The guard-finger Y, which is attached to the slide, is moved out of engagement with the toe of the tying-bill while the ridge of the slide is in engagement with the catch-tongue, and does not obstruct the action of said ridge in pushing the loop off the tying-bill.

Having described this invention, what we claim, and desire to secure by Letters Patent, is—

1. In a grain-binder, a rotating tying-bill having the branches $a^2$ $a'$, a catch-tongue pivoted between the branches $a'$, a closing-slide operating in connection therewith, and devices for moving the same, substantially as specified.

2. In a grain-binder, the curved reciprocating twine-carrying needle having the concaved recessed edge H' and the pivoted spring-actuated compressor $M^2$, in combination with the lever M, its arc-shaped cam M', the wheel F, and the connecting mechanism, substantially as specified.

3. In a grain-binder, the combination, with the compressor pivoted at the base of the inclined plane, and the wheels E and $g$, of the coupling-dog D, stop-lever H, the lever T T, pivoted to the foot-board, and the needle-arm N E, provided with the pivoted compressor $M^2$, substantially as specified.

4. In combination with the knotter, the slide Z, carrying the rib $z'$ and the cutter Z', substantially as specified.

5. In a grain-binder, the tying-bill having an upper branch, $a^2$, and two lower branches, $a'$, and a pivoted tongue-catch, $z$, between said lower branches, substantially as specified.

6. In a grain-binder, the combination, with a twine-holder, and a rotary tying-bill having a connected catch-tongue, of a reciprocating slide having a guard-finger, Y, and rib $z'$, substantially as specified.

7. In a grain-binder, the combination, with the tying-bill, closing-slide, and twine-holder, of the wheel T on the binder-shaft, its segment-gear S and cams V V, the pinion Q' on the looper-stem, and the levers P P', substantially as specified.

8. In a grain-binder, a rotary twine-holder having marginal studs, an eccentric bearing, and side disks, a ratchet-and-pawl movement, and a lateral cap-piece engaging the rotary holder by spring-pressure, substantially as specified.

9. In a grain-binder, the combination, with the binder-shaft carrying the spring-dischargers N and the crank-arm $n$, of the rock-shaft $j'$ on the foot-board, its segment-gear $l'$, and the slide-arm $m$, having the rack $m'$, substantially as specified.

In testimony that we claim the above we have hereunto subscribed our names in the presence of two witnesses.

HANS AMUNDSON.
AMOND OLSON.

Witnesses:
W. M. ROSS,
A. J. OLDS.